US006973884B2

(12) United States Patent
Dietrich, Sr.

(10) Patent No.: US 6,973,884 B2
(45) Date of Patent: Dec. 13, 2005

(54) SLURRY FERTILIZER APPLICATOR

(75) Inventor: William J. Dietrich, Sr., Goodfield, IL (US)

(73) Assignee: Soycorp, Inc., Goodfield, IL (US)

( * ) Notice: Subject to any disclaimer, the term of this patent is extended or adjusted under 35 U.S.C. 154(b) by 0 days.

(21) Appl. No.: 11/018,099

(22) Filed: Dec. 20, 2004

(65) Prior Publication Data

US 2005/0132943 A1 Jun. 23, 2005

Related U.S. Application Data

(60) Provisional application No. 60/532,497, filed on Dec. 23, 2003.

(51) Int. Cl.[7] ............................................ A01C 23/02

(52) U.S. Cl. ................................................. 111/121

(58) Field of Search ........................ 111/118, 121, 122, 111/123, 124, 156, 167; 405/51, 128, 130, 405/270, 258; 239/201, 207

(56) References Cited

U.S. PATENT DOCUMENTS 4,592,294 A * 6/1986 Dietrich et al. ............ 111/123
4,834,189 A * 5/1989 Peterson et al. ........... 172/166
5,357,883 A * 10/1994 Depault ..................... 111/118
5,566,627 A * 10/1996 Pryor ........................ 111/118
5,865,131 A * 2/1999 Dietrich et al. ............ 111/121

* cited by examiner

*Primary Examiner*—Robert E Pezzuto
(74) *Attorney, Agent, or Firm*—Emrich & Dithmar LLC

(57) ABSTRACT

An applicator unit for applying slurry fertilizer beneath the soil with reduced soil displacement includes a spring-cushioned main mounting shank and a forward spring-biased colter. A narrow applicator shank is mounted to the main mounting shank by a pair of vertically spaced bolts, including a lower shear bolt, at a location just above the surface of the soil. The sweep shank is generally upright and includes a nose portion at a lower leading edge which includes a generally blunt lower portion and a tapered leading edge for forming a furrow without tilling the soil. The furrow is formed in three stages by the blunt nose pad, the upright tapered leading edge of the sweep shank, and by a pair of mounting plates carrying the slurry tube and widening the top of the furrow.

6 Claims, 6 Drawing Sheets

SLURRY FERTILIZER APPLICATOR

RELATED APPLICATIONS

This application claims the benefit under 35 U.S.C. 120 of co-pending U.S. Provisional Application 60/532,497 for "SLURRY FERTILIZER APPLICATOR" filed Dec. 23, 2003.

FIELD OF THE INVENTION

The present invention relates to agricultural fertilizer applicators; and more particularly, it relates to apparatus for subsoil application of livestock waste in the form of a slurry (that is, a freely flowable mixture of liquids and solids).

BACKGROUND OF THE INVENTION

Historically, livestock waste, particularly in solid form, has been spread on the surface of the soil by a manure spreader using a flail to fling the material to the rear. A more modern side-discharge spreader also deposits the material on the surface of the soil.

The advent of confinement systems for animals which include pits below the confinement area, produces a large amount of animal waste in a slurry form which must be handled and disposed of. Typically, the slurry is pumped in a large tank carried by a wagon, but originally it was for the most part, spread or sprayed on the surface of the soil.

This procedure has, as a principle objection, a strong odor which remains after the waste is spread. Moreover, surface spreading of animal waste is not desirable with the potential runoff of nitrates and phosphorus into rivers and streams or seeping of the material into ground water sources. This is objectionable because livestock waste is high in nitrogen, and swine waste is also high in phosphorus, and with increasing concern with the quality of drinking water, this procedure is becoming less and less acceptable.

Various methods have been proposed for depositing the slurry underground. One method is to use a fertilizer knife, such as shown in U.S. Pat. No. 4,592,294, and to weld a large pipe to the rear of the knife to deliver the slurry behind the knife and into the slot cut in the soil by the knife. This leaves a very narrow band of fertilizer having a high concentration of nitrogen and other nutrients.

Another method of subsoil delivery of animal waste employs a standard chisel plow shank with an attached wide cultivator sweep, in an attempt to distribute the slurry further laterally and to avoid the concentration which occurs in the case of a simple fertilizer knife, described above.

This method, however, has not fully overcome the concentration problem, and it presents still another problem—namely, the cultivator sweep unnecessarily tills the soil and may result in burying surface residue. This may be a separate problem, particularly for farmers whose land may have been designated HEL, because there are federal requirements to maintain a certain percentage of crop residue on the surface of such soil. Both the chisel plow shank (which is a wide shank) and cultivator sweeps are designed to create a plowing action that mixes the soil with the residue, buries a large percentage of the residue, and leaves a furrow behind the shank.

A more recent improvement is disclosed in U.S. Pat. No. 5,865,131. This device uses a spring-cushioned colter running ahead of the applicator for cutting an initial slot in residue and providing a break line in the soil to be parted by a trailing shank. The shank spreads the initial slot and deepens it. The shank includes a shoe provided with a pair of wings extending laterally. The shoe is in the form of a tillage point which fractures and lifts the soil in front of the shank. The wings lift the soil laterally of the shank from the center toward the outward ends of the wings to provide slots for promoting lateral distribution of the slurry.

The applicator of the '131 patent is suitable for delivering higher application rates of slurry, in the range of 9,000 to 10,000 or more gallons per acre. However, the ground speed of the '131 patent is limited to a range of 3–5 miles per hour. At these slower speeds, the soil is lifted sufficient to form lateral fissures in the soil at a depth of approximately 3 to 4 inches which permits the slurry to flow laterally of the applicator shank. Any greater speed would cause too much soil disruption, lifting and redistribution (i.e. tillage) due to the use of a forward portion of the shoe which acts like a plow point, having a surface which is inclined upwardly and rearwardly for fracturing and lifting the soil in front of the shank.

Current regulations for the application of slurry fertilizer to agricultural land limit the rates of slurry in the range of 3,400 to 5,000 gallons per acre. This lower application rate enables operators to run at higher ground speeds, greater than 5.0 miles per hour, and up to 8.0 miles per hour. On the other hand, if the apparatus of the '131 patent were run at a substantially higher speed, due to its structure, and primarily due to a leading point or shoe which had an inclined nose extending upwardly and rearwardly from the leading edge, it would create a lifting of the soil after fracturing it. At higher speeds the '131 device acts like the shank of a chisel plow, not only creating substantial turbulence in the soil, but burying surface residue, which, in certain applications mentioned above is undesirable.

SUMMARY OF THE INVENTION

The present invention is designed for the new, reduced application rates for slurry fertilizer, and operation at speeds in the range of 5 to 8 miles per hour. The present invention employs a spring-cushioned colter running ahead of the applicator for cutting an initial slot in any residue and providing a vertical parting line in the soil to receive the trailing shank which mounts the ground-engaging sweep and to minimize soil disruption.

The mounting shank of the sweep is curved and extends rearwardly and downwardly of the colter and attaches to a sweep shank at a location slightly above the surface of the soil. This permits the use of a heavier mounting shank and a lighter sweep shank. The sweep includes a shank mounted to the rear of the mounting shank. The sweep shank is thin, preferably less than about 0.5 in. in width. The sweep shank is mounted to the distal end of the mounting shank by two vertically spaced bolts, one of which is a shear bolt. The instant invention permits the sweep shank to be mounted to the main mounting shank at a location slightly above the normal ground level for operating the unit. This has the advantage that the sweep shank need not be as bulky as when mounted higher because if an obstruction is encountered and the shear bolt breaks, the sweep shank can pivot upwardly and clear the obstruction very quickly. Thus, the sweep shank does not have to be strengthened and bulked to the limits required in previous units, allowing the sweep shank to be narrow and cause less soil displacement.

The sweep shank of the present invention is in the form of a plate and preferably includes a nose portion which may be a casting mounted in front of and at the base of the sweep shank. The lower rear portion of the main mounting shank is offset so that the center line of the main mounting shank and the sweep shank may be aligned in the direction of draft. The nose casting has a width substantially the same as the sweep shank which, as indicated, is less than about 0.5 in. Moreover, the front surface of the nose casting, in the illustrated embodiment, has a lower portion which is slightly curved but is generally blunt, and it is oriented in a generally vertical disposition so that it does not lift the soil appreciably, but rather breaks the soil and parts it at the operating depth. The upper portion of the nose casting may be tapered from a narrow leading edge to the width of the sweep shank at its rear.

First and second wings are mounted to the sides of the sweep shank respectively. The wings are located at the operating depth of the unit; and they form fissures on the left and right side of the sweep shank, permitting the slurry to flow into the fissures behind the wings, without substantially lifting or turning the soil or bearing any surface residue.

Behind the sweep shank tube and mounted to it by means of a horizontal bolt acting as a pivot, is the slurry tube which delivers the slurry behind the sweep shank and deposits the slurry into the narrow furrow formed by the sweep shank. By pivotally connecting the slurry tube to the sweep shank at a location slightly above the soil surface, if the sweep shank shear bolt does break, the slurry tube can rotate out of harms way quickly and without binding or interfering with the sweep shank as it pivots rapidly out of the way.

The slurry discharge tube is pivotally mounted to the sweep shank by a pair of plates which extend into the furrow formed by the sweep shank and further open the top of the furrow to accommodate the slurry tube.

The improved applicator thus extends the lateral distribution of the slurry, thereby reducing high concentrations of slurry, and extends the area in which the fertilizer is available as a nutrient for plants, while permitting operation at higher ground speeds. At the same time, the surface of the soil and any residue are left substantially undisturbed, even at higher ground speeds of 5–8 mph. Operation at these speeds is facilitated, without an undesired amount of soil displacement, as a result of a three stage furrow formation and widening. First, the blunt, upright lower portion of the nose of the sweep shank fractures the soil and spreads it laterally over a narrow width. Next, the leading edge of the sweep shank opens the furrow to approximately one-half inch to the desired depth. Finally, the slurry tube mounting plates, extending beneath the surface of the soil, widens the upper portion of the furrow to receive the lower portion of the slurry discharge tube, insuring that the slurry will be contained by the furrow. Means may be provided for closing the narrow furrow left by the shank, but the furrow is small and narrow when the furrow shank has a narrow width, as is preferred, so closing of the furrow is not necessary.

The invention includes novel features and a combination of elements described and illustrated fully herein. It will be understood that various modifications may be made without departing from the spirit of the invention or sacrificing any of its advantages.

DETAILED DESCRIPTION OF THE ILLUSTRATED EMBODIMENT

Figure 1:
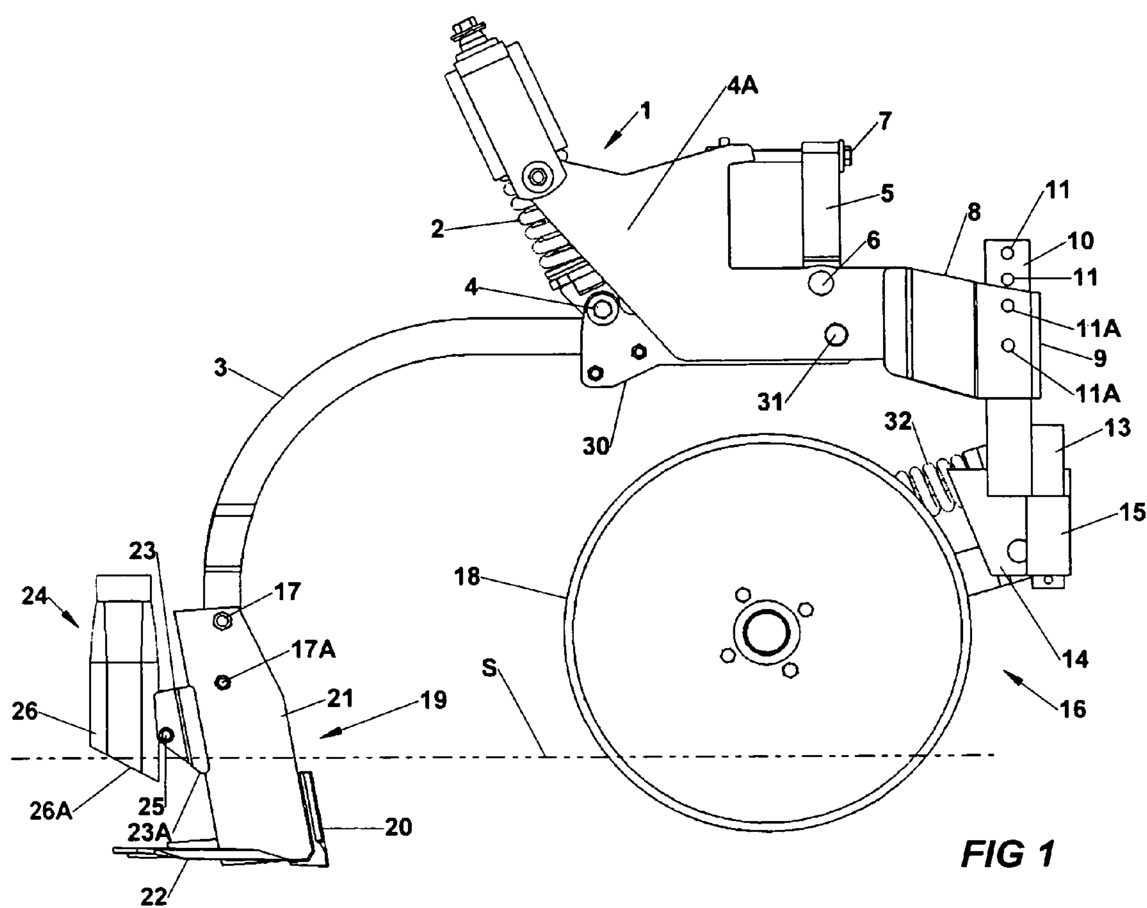
FIG. 1 is a right side elevational view of an applicator for depositing slurry fertilizer incorporating the present invention.

Referring to FIG. 1, a left side view of the overall applicator unit. Reference numeral 1 generally designates a spring reset mechanism for a single row unit of a slurry applicator. As is known, a number of such applicator units are mounted on a wagon or tool bar drawn by a tractor. The applicator units are mounted in side-by-side relation, and spaced apart. The tool bar or frame may have its own support wheels, or be mounted to a wagon carrying the slurry. In any case, it trails a slurry wagon or container for a large amount of slurry fertilizer which is to be applied to a field. A spring 2 is compressed (i.e. preloaded) and pivotally connected to a main mounting shank 3 by a bolt 4. When a rock or other obstruction is encountered by the sweep 19, the main shank 3, applicator sweep 19 and slurry tube 24 are pivoted up and away from the obstruction.

The spring cushion mechanism is mounted to a conventional toolbar by shank mount 4A and a bracket 5 that pivots on bolt 6. When an upper bolt 7 is inserted, bracket 5 tightly clamps against the tool bar tool (not shown) located in the rectangular opening, between the bracket 5 and mount 4A. At the forward portion of the mounting assembly, formed steel plates 8 are welded. At the forward portion of plates 8 is a cross piece of steel 9. A similar piece of steel is welded behind a colter mount bar 10. This provides a rectangular sleeve or receptacle so that the colter mount bar 10 can be telescoped vertically within the sleeve and pinned (see pins 11A) to adjust the colter 18 to the desired operating depth. Additional holes 11 are provided in colter mount bar 10 to allow for a wide range of different operating depths for the colter.

On the lower forward portion of colter mount bar 10 a vertical shaft 13 is welded and the forward portion of the spring-cushioned colter assembly 14 is provided with a sleeve 15 to telescope over the shaft 13. The colter assembly 16 including blade 18 is similar to assemblies used on various agricultural tillage tools for forming a slit in the soil and for cutting residue at or near the surface. A spring 32 compresses to allow the colter blade 18 to ride over rocks and obstructions and then be reset to the desired operating depth. The colter assembly may be similar to many widely used on tillage tools.

Figure 4:
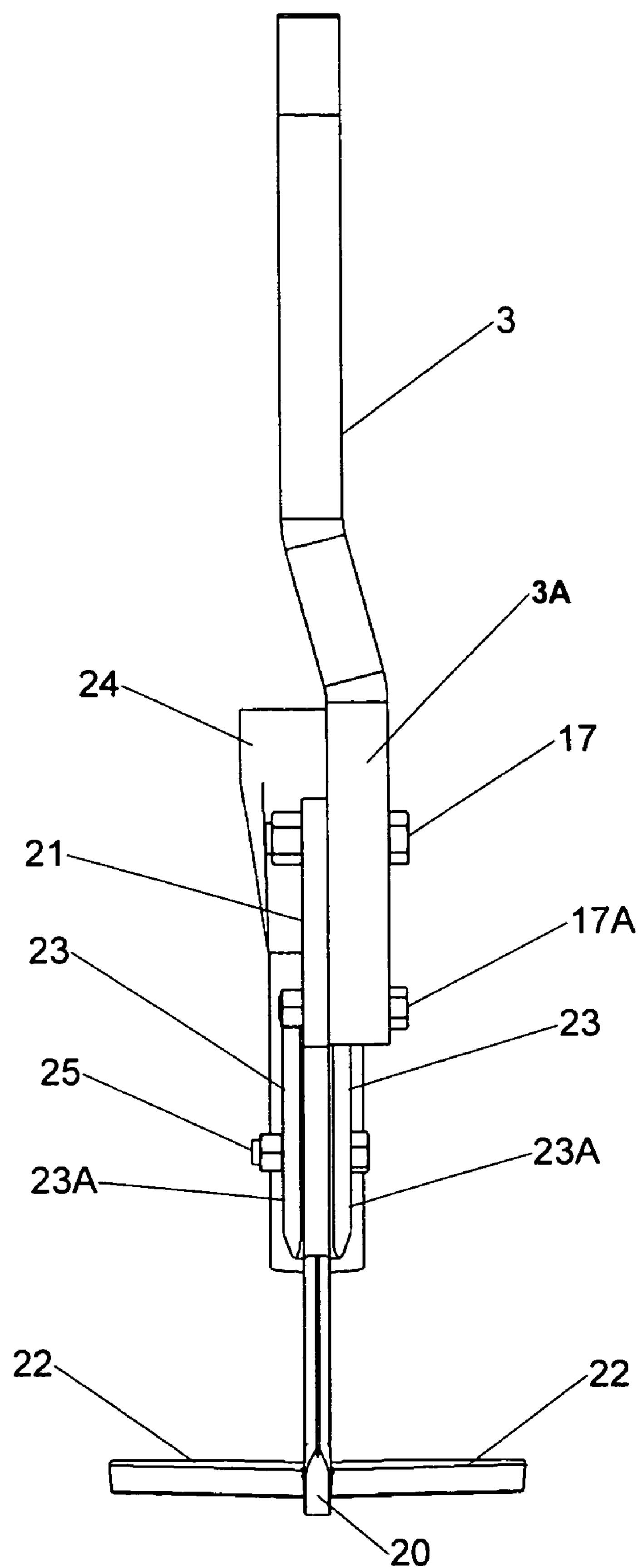
FIG. 4 is a close-up front view of the sweep assembly and lower offset section of the main mounting shank.

Turning now to the sweep and its mounting, the main or mounting shank 3 is attached to the coulter spring reset assembly 1 by a bracket 30 mounted to a pivot 31 in mounting frame 4A. A sweep assembly generally designated 19 is bolted to the mounting shank 3 with an upper bolt 17 and a lower one, 17A, which is a shear bolt. The sweep 19 includes a sweep shank 21 which is a flat steel plate having a thickness of less than about 0.5 inches, and which is bolted to a lower, offset portion 3A of the mounting shank 3 for mounting by bolts 17, 17A, as seen in FIG. 4. Thus, when viewed along the direction of travel, the center of the sweep shank 19 is aligned with the center of the main portion of the mounting shank 3; and the two overlap in side-by-side relation. This, coupled with the location of the mounting bolts 17, 17A just above the soil level, diagrammatically represented at S in FIG. 1, permits the main mounting shank 3 to be wider and thus stronger, while the sweep shank can be narrower and thus provide operational advantages, as will be clear to those skilled in the art. The lower forward portion of the sweep shank 21 includes a nose casting 20 welded to it or integral with it. Nose casting 20 is generally upright in the field operating position—i.e. the leading edge may be inclined upwardly and rearwardly to an angle of less than about 15° relative to the vertical to part the soil to permit the sweep shank 21 to pass through the soil without unduly lifting or raising the soil. Alternatively, the nose casting may be replaced with hard surface welding wire applied to the lower front surface of the sweep shank, but the upper front edge of the sweep shank must then be tapered and formed into the shape and size of the nose casting, as will be described.

Left and right wings 22 are attached to the lower portion of sweep assembly 19 behind the nose casting 20 to slightly lift the soil and provide a horizontal space or fissure for the slurry to spread out and disburse laterally behind the sweeper on both sides of the shank 21. The spaces or fissures contain and disburse the delivered slurry while creating a minimum of soil disturbance. Specifically, the wing plates 22 preferably have an elevation angle of less than 5 degrees with the horizontal. Formed mounting plates 23 (FIGS. 1 and 3) are welded to the left and right sides respectively of the sweep shank 21 to mount the end 26 of the slurry tube at a height such that at least the lower portions of these tube mounting plates 23 pass through the soil and further open the furrow adjacent the surface. A slurry delivery tube 24 has a discharge tube which is flattened on its sides to fit the furrow. A sleeve or bushing is welded to the front of discharge tube 26 to receive a bolt 25 carried by the plates 23 to form a pivot. Slurry tube 24 pivots about bolt 25 so that if the lower attachment shear bolt 17A shears when hooking on an obstruction, slurry delivery tube 24 will pivot rearward and upwardly to avoid jamming the hose that is attached to the upper portion of tube 24 when the unit is installed on the wagon or toolbar that carries the slurry.

The sweep shank 21 is approximately ½ in. thick but the width may vary from 5⁄16 inches to ¾ inches. Plates 23 also provide strength and stiffness to resist bending the sweep shank 21. The lower discharge portion 26 of slurry delivery tube 24 is flattened sideways to facilitate the flow of slurry in the narrow furrow created by the shank portion 21 of the sweep. The lower portion 26 of the standard 3 in. OD tube is flattened to approximately 1¼ to 1½ in. wide inside.

Of significance, mounting shank 3 extends rearwardly and is curved and extends down to a location near but above the soil surface S. This permits the sweep shank 21 to be short in vertical length. That is, the sweep shank extends from the operating depth to a few inches above the soil, as opposed to a few feet above the soil. Therefore, bending of the sweep shank is not a significant problem even though it is only approximately ½ in. thick.

In operation, the soil is first fractured by a lower blunt pad on the nose portion. It then is parted by the tapered leading edge of the sweep shank and flows past the ½ in. thick sweep shank 21 which may appear insufficient to allow passage of the 1½ in. wide lower portion 26 of the slurry tube 24 (see FIG. 2). However, the plates 23 are spread apart in the rear direction so that the flow of slurry is guided by the slight lateral movement of the soil by the discharge portion 26 of the slurry tube 24. That is, the plates 23 and the bottom portion 26 of the slurry tube helps to widen the upper portion of the furrow for receiving slurry.

The lift action of the wings 22 is slight, not pronounced. The lift forms an opening near the surface of the soil slightly wider than the width of the sweep shank. The wings 22 sweep outward and rearward providing a slight lift to the soil (less than about 5°)resulting in the horizontal cavity or soil fissure for the slurry to flow laterally. The wings have sharpened leading edges 28, and are formed slightly rearwardly in a V shape to better penetrate the soil and still result in only slight lift of the soil. A plate 29 (FIG. 3) braces the rear portions of the wings.

Figure 2:
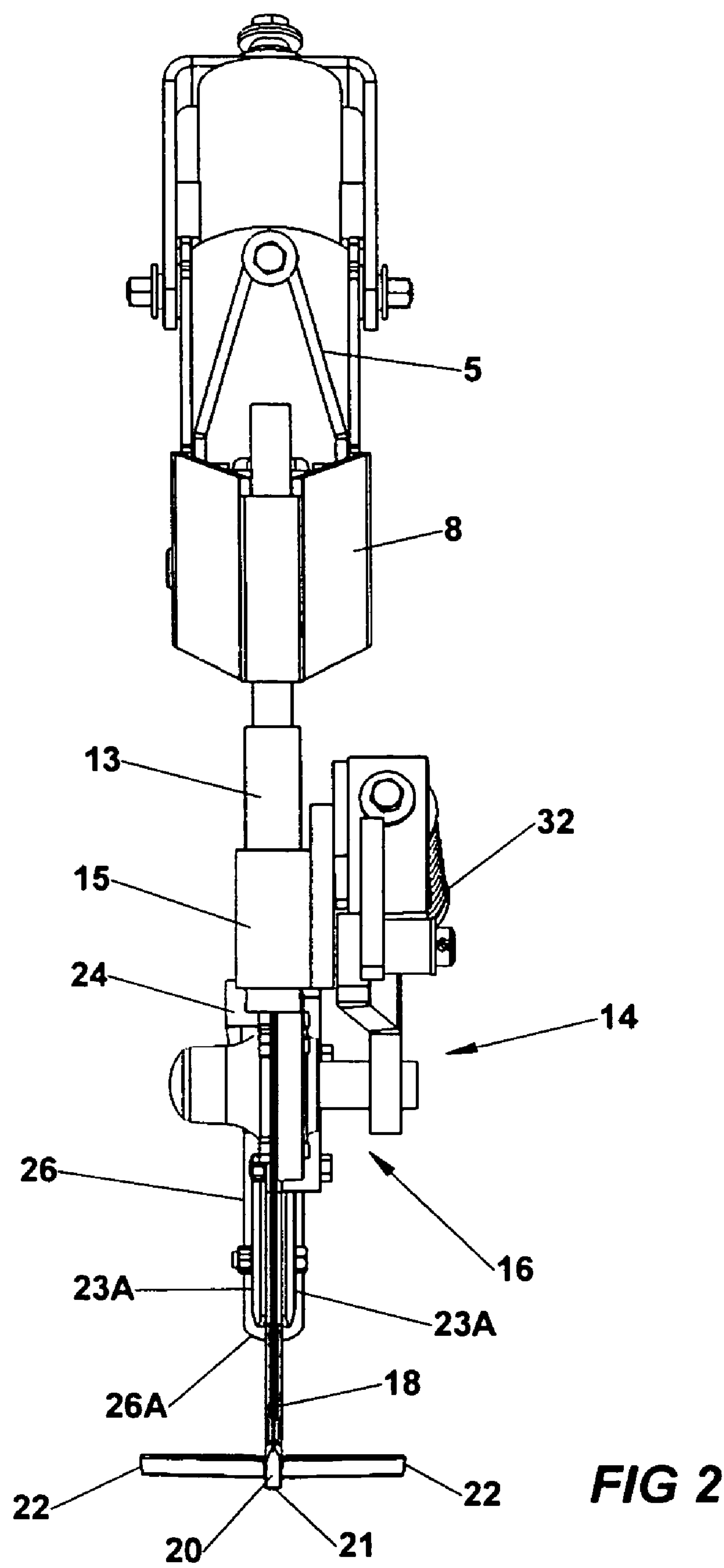
FIG. 2 is a front elevational view of the applicator of FIG. 1.
Figure 3:
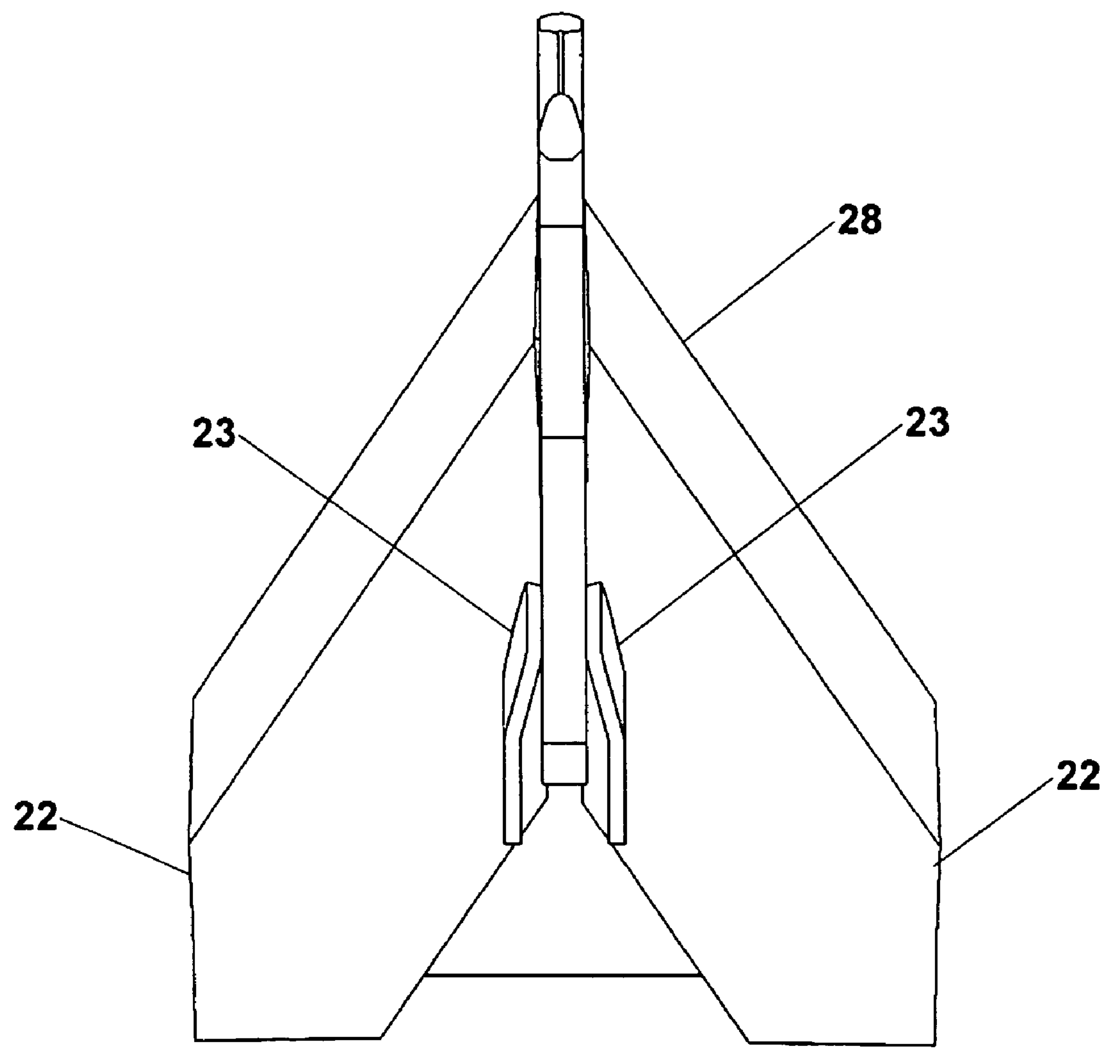
FIG. 3 is a top view of the sweep shank, with the slurry tube removed for clarity.

FIG. 2 is a front view, illustrating the formed plates 8 and assembly mounting bracket 5. It will be observed from FIGS. 2–4 that the width of the lower portions 23A of the tube mounting plates 23 are beneath the soil surface S to widen the furrow formed by the sweep shank to help accommodate the discharge tube 26 of the slurry tube. FIG. 3 is a top view of the sweep 19 with slurry tube 24 omitted for clarity.

The wings 22 as shown are swept rearward (viewed from the top) at 55 degrees, and only slightly upward, as described. In most soil conditions, 55 degrees creates minimal, acceptable soil movement. In some soil conditions, a 40 degree wing attack angle does not have an adverse affect on soil movement.

FIG. 4 is a front view of the sweep 19 showing the slurry tube 24 and an offset portion 3A formed at the lower, distal end of the curved mounting shank 3 for mounting the center of sweep shank 21 in vertical alignment with the center of the upper portion of main mounting shank 3.

Figure 5A:
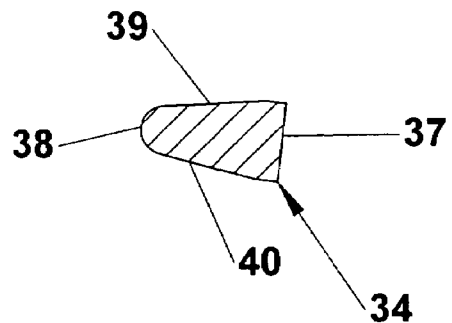
FIG. 5A is a cross sectional view of the nose portion of FIG. 5 taken through the sight line A—A of FIG. 5.
Figure 5B:
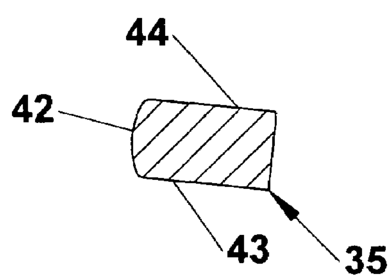
FIG. 5B is a cross sectional view of the nose portion of FIG. 5 taken through the sight line B—B of FIG. 5.
Figure 5:
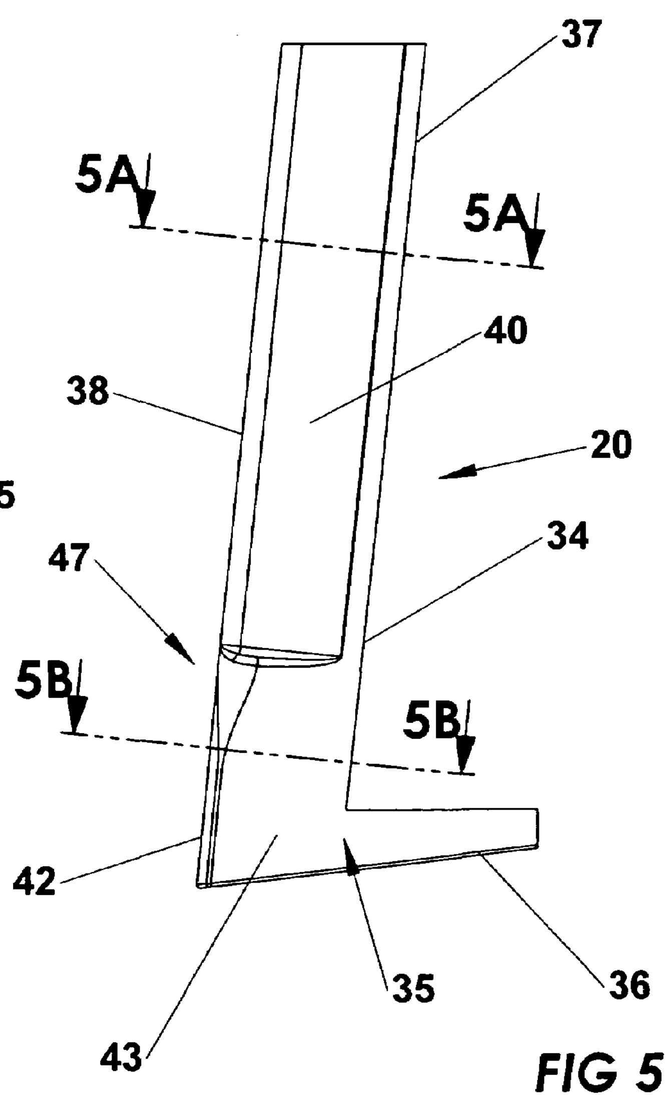
FIG. 5 is a left side elevational view of the nose portion of t he sweep shank.

Turning now to FIGS. 5, 5A and 5B, the nose casting 20 which may be of hardened steel or other abrasion-resistant material, includes an upper portion 34 and a lower portion 35 which are centered behind the colter blade 18 and on the sweep shank; and it includes a bottom surface 36 which may be tapered upwardly and rearwardly so that soil does not adhere to the bottom surface. This helps to form a well defined opening or furrow.

The upper portion 34 of the nose 20 is tapered to form a leading edge, as best seen in cross section in FIG. 5A. The back of the upper portion 34 (FIG. 5) of the nose casting may be flat as at 37 (FIG. 5A). The nose casting is tapered to form a rounded but fairly sharp leading edge 38 defining first and second inclined lateral parting surfaces 39, 40. The bottom portion 35 of the nose casting includes a leading surface 42 in the form of a pad (FIG. 5B) which is more blunt than the leading cutting edge 38 and tapered shape of the upper portion 34. The blunt surface 42 may be close to flat or formed at a larger radius such as 0.5 in. or larger. The lower section 35 of the nose may have generally flat and parallel sides 43, 44. By having the front surface 42 of the lower portion 35 blunt (which term is intended to compare with cutting edge 38 and to include the slightly rounded surface described above), when the sweep is pulled through the soil, the soil is fractured, opened and parted laterally but with minimum upward motion since the front blunt surface 42 is substantially upright as seen in FIG. 5 and described above.

Figure 6:
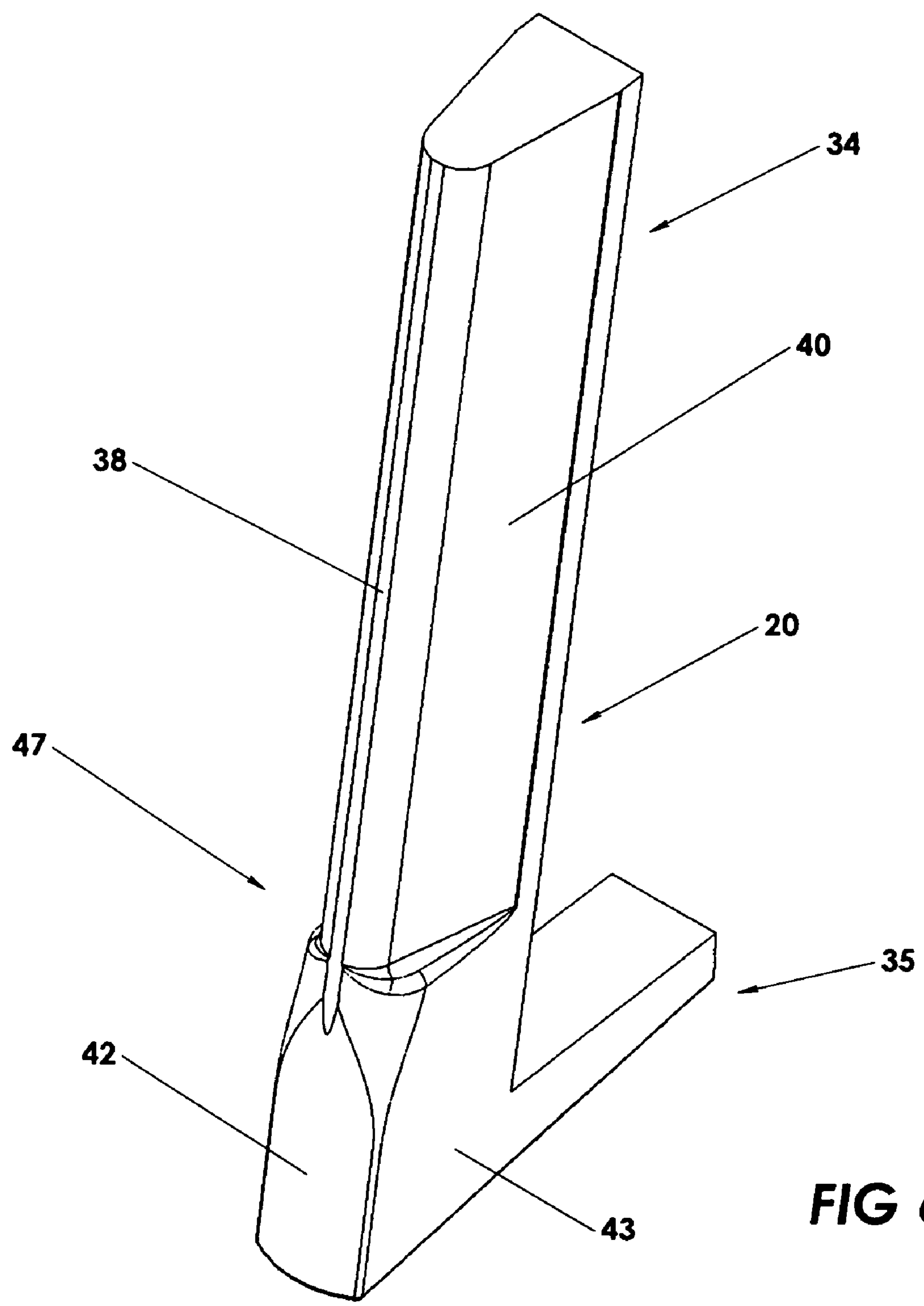
FIG. 6 is a perspective view of the nose portion of FIG. 5 taken from an upper, frontal and right side perspective.

In this respect, the angle of the front surface 42 may extend upwardly and rearwardly less than 15° with the vertical, but a few degrees difference will not make a substantial change in the operation. In the lower mid region of the nose portion, designated 47 in FIG. 5, there is a transition between the blunt forward surface 42 of the lower section 35 of the casting 20, as seen in the illustration of FIG. 6, to the upper cutting edge 38.

In the alternative, the sweep shank could be preformed into the desired shape as represented by the front and lower surfaces of the disclosed nose casting, and its width; and hard surface (welding wire) may be applied to all the forward, soil-engaging surfaces.

Having thus disclosed in detail one embodiment of the invention, persons skilled in the art will be able to modify certain of the structure shown and to substitute equivalent elements for those disclosed while continuing to practice the principle of the invention, and it is, therefore, intended that all such modifications and substitutions be covered as they are embraced within the spirit and scope of the claims.

I claim:

1. Apparatus for applying slurry fertilizer in a furrow beneath the surface of soil comprising;

a mounting frame having a forward end and a rear end;

a main shank mounted at a first end to said mounting frame for rotation about a horizontal axis and extending rearwardly and downwardly, defining a curvature and having a distal end located adjacent said surface of said soil;

a spring mounted to said mounting frame at one end and to said main shank at a second location to cushion said main shank;

a sweep shank having a width no greater than approximately one-half inch transverse to the direction of travel of said apparatus, and defining a tapered leading edge, and a nose extending along a lower portion of said leading edge of said sweep shank, a lower, frontal surface of said nose being generally blunt and upright to break said soil at the bottom of said furrow without raising soil substantially, said leading edge extending above said generally blunt surface for parting soil to form said furrow;

a sweep carried by said sweep shank and including left and right side wings extending in a substantially horizontal plane for creating left and right lateral fissures; and a slurry delivery tube extending behind said sweep shank and pivotally mounted thereto for delivery of slurry into the formed furrow, said slurry flowing into said lateral fissures.

2. The apparatus of claim 1 wherein said sweep shank is in the form of a plate having a generally uniform thickness of approximately 0.5 in., and elongated along the direction of travel of said apparatus, said apparatus further comprising:

a first bolt securing said sweep shank to a portion of said main shank adjacent said distal end thereof; and a shear bolt for securing said sweep shank to said main shank at a location beneath said first bolt when said mounting shank is in the use position.

3. The apparatus of claim 2 further comprising first and second side plates fixed respectively to the sides of said sweep shank at a location adjacent the level of said soil in the use position, a lower portion of said first and second side plates extending into the furrow formed by said sweep shank; and a pivot member supported by said first and second side plates of said sweep shank for pivotally mounting a front edge of said slurry tube to said pivot member.

4. The apparatus of claim 1 further comprising first and second side plates fixed to the rear of said sweep shank and extending above and below the level of said soil in use position, said side plates extending rearwardly and outwardly of said sweep shank, lower portions of said side plates cooperating to widen the upper portions of the furrow formed by said sweep when said apparatus moves forwardly to widen the upper portion of said furrow for receiving a lower discharge tube of said slurry tube.

5. The apparatus of claim 1 further comprising a colter assembly mounted to said unit frame at a forward location and including a spring-biased colter located in front of said sweep shank for parting the soil as said apparatus is pulled forwardly.

6. The apparatus of claim 1 wherein said nose portion of said sweep shank comprises a casting fixed to the lower front edge of said sweep shank and defining said lower frontal portion thereof and said upper leading edge thereof, said blunt frontal surface being characterized as having a radius of curvature in a horizontal plane of at least approximately 0.5 inches.

* * * * *